Sept. 18, 1951  W. R. MYERS ET AL  2,567,960
PLASTIC EXTRUSION GUN
Filed Oct. 3, 1949  2 Sheets-Sheet 2
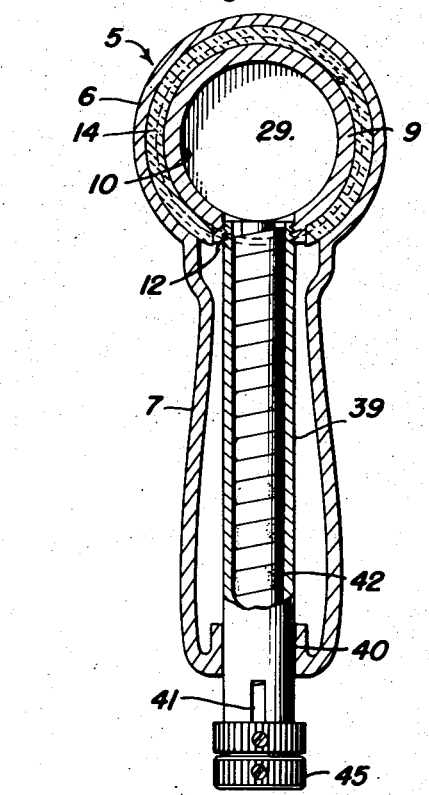
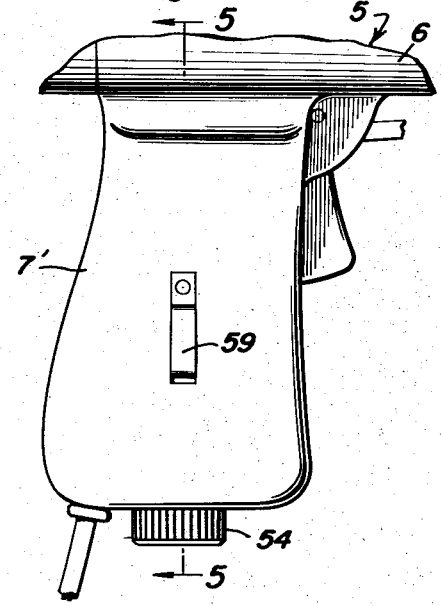
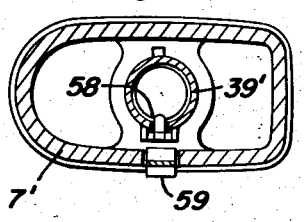
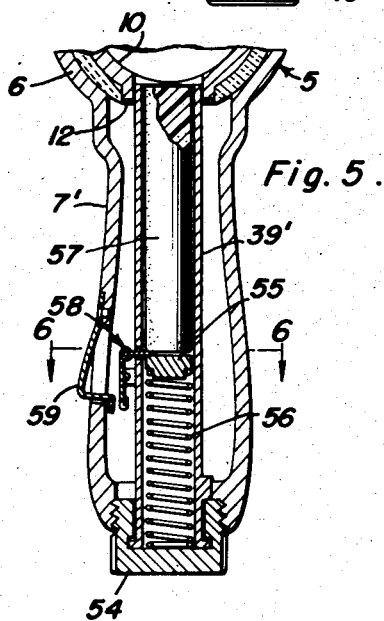
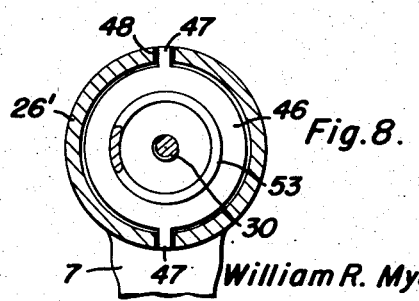
William R. Myers
Albert S. Tennant
INVENTORS.

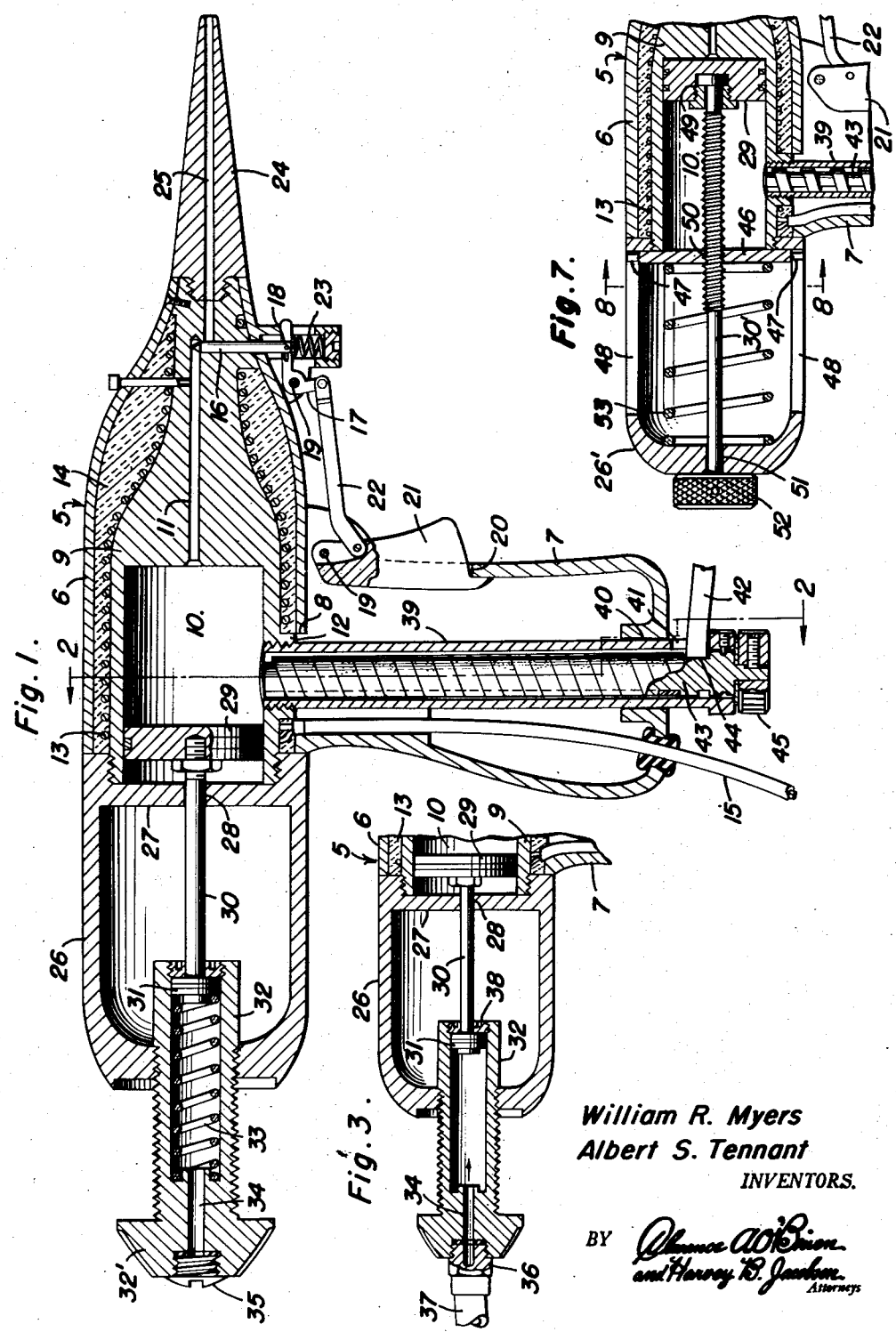

Patented Sept. 18, 1951

2,567,960

UNITED STATES PATENT OFFICE 2,567,960

PLASTIC EXTRUSION GUN

William R. Myers, Charleston, and Albert S. Tennant, South Charleston, W. Va.

Application October 3, 1949, Serial No. 119,232

5 Claims. (Cl. 18—3.5)

1

This invention relates to a gun type instrument for melting and extruding plastic material, the instrument being primarily designed for use in the manufacture of fishing flies by applying the molten plastic material to fishhooks to form thereon elements simulating the body, legs or feelers, and other members of insects.

The primary object of the invention is to provide a comparatively simple and efficient instrument of the above kind by means of which the plastic material may be readily melted and readily applied to the hooks or other objects as desired.

Another object is to provide an instrument of the above kind including a body portion provided with a depending hollow handle and formed with a cylindrical heating chamber in which the plastic material is melted, said chamber having a restricted outlet passage at its front end, a magazine for plastic material mounted in the handle and having means to feed the material into the heating chamber, piston means for forcing the molten material from said chamber through said passage, and a trigger opened spring closed valve for controlling the flow of molten material through said passage.

A further object is to provide a magazine adapted to receive plastic material in ribbon form and including means to feed such material into the heating chamber.

Still another object is to provide novel piston means for forcing the molten material from the heating chamber.

Other objects and features of the invention will become apparent from the following description when considered with the accompanying drawings, in which:

Figure 1 is a central longitudinal sectional view of a plastic extrusion gun embodying the present invention;

Figure 2 is a transverse vertical section thereof, taken substantially on the line 2—2 of Figure 1;

Figure 3 shows on a reduced scale the rear portion of the gun shown in Figure 1, conditioned to use fluid pressure for operating the piston which forces the molten material from the heating chamber;

Figure 4 is a fragmentary side elevational view of the handle portion of the gun having a modified form of magazine;

Figure 5 is a vertical transverse section taken on the line 5—5 of Figure 4;

Figure 6 is a horizontal section taken on the line 6—6 of Figure 5;

Figure 7 is a view somewhat similar to Figure 3 showing a modified form of piston means for forcing the molten material from the heating chamber;

Figure 8 is a vertical transverse section taken on the line 8—8 of Figure 7.

Referring in detail to the drawings, the present instrument includes a body portion 5 embodying an outer shell or casing 6 provided with a depending hollow handle 7 and having an opening 8 communicating with the interior of said handle, and an inner member 9 disposed and supported in spaced relation to and within the casing 6 and formed with a rear cylindrical heating chamber 10, a restricted outlet passage 11 leading from the front of chamber 10 through the front end of said member 9, and a bottom inlet nipple 12 communicating with the chamber 10 near the rear end of the latter and depending in registry with the opening 8. A heating element or coil 13 surrounds the member 9 and is embedded in a packing of heat insulating material 14 provided in the space between the casing 6 and member 9 to prevent dissipation of heat from the element 13 to casing 6. The ends of element 13 are connected to the wires of a conductor cord 15 which leads through the handle 7, and current supplied to the element 13 by way of cord 15 may be suitably controlled and regulated.

Flow of material from chamber 10 through passage 11 is controlled by a valve 16 slidably mounted in the front part of member 9. A bell crank lever 17 is pivotally mounted on the bottom of casing 6 and operatively connected at one end to valve 16 through a pin and slot connection 18. Pivoted at its upper end as at 19 to handle 7 and movable in a slot 20 provided in the upper front portion of said handle is a trigger 21 which is connected to the other end of lever 17 by a link 22. A spring 23 acting upon lever 17 normally closes the valve 16. A suitable discharge nozzle or tip 24 has a reduced end removably threaded into the front end of member 9 with its bore 25 aligned with passage 11, as shown in Figure 1.

A hollow body extension 26 is threaded on the rear end of member 9 and abuts the casing 6, said extension having a transverse wall 27 near its front end which covers the rear end of chamber 10 and has a central opening 28. Slidable in the chamber 10 is a piston 29 adapted to be moved forwardly to force molten plastic material from said chamber through passage 11 and bore 25 of the tip 24. Piston 29 has a rearwardly extending rod 30 movable through opening 28 and provided on its rear end with a small plunger 31. The plunger 31 is slidable in a cylinder 32 adjustably threaded through a central opening in the rear end of the extension 26 and having an operating knob 32'. As shown in Figure 1, a helical compression spring 33 may be placed in the cylinder 32 between the rear end of the latter and plunger 31 so that said spring may be placed under compression by screwing said cylinder forwardly to move the plunger 31 and the piston 29 in a similar direction so as to force the material from chamber 10. It will be apparent that piston 29 may be retracted by screwing the cylinder 32 rearwardly to relieve the spring 33 of compression and draw the plunger 31 rearwardly. However, the spring 33 may be dispensed with, and pressure fluid may be used to actuate plunger 31 for moving piston 29 to force the molten material from chamber 10, as shown in Figure 3. For this purpose, the cylinder 32 has an axial inlet passage 34 for pressure fluid, through its rear portion, and the rear end of this passage is enlarged and threaded to selectively detachably receive a closure plug 35 or the end coupling 36 of a pressure fluid supply hose 37. The plug 35 is used when spring 33 is employed, and said plug is removed when spring 33 is dispensed with and the hose 37 is coupled to cylinder 32. In the latter case, cylinder 32 is screwed forwardly to dispose plunger 31 at the rear end of cylinder 32 when piston 29 is retracted, fluid being exhausted from cylinder 32 behind plunger 31 through hose 37. It is then simply necessary to supply pressure fluid to cylinder 32 from hose 37 to move the plunger 31 forwardly, thereby correspondingly moving piston 29 to force the material from chamber 10. Piston 29 may be retracted by screwing the cylinder 32 rearwardly to the position of Figure 3 with the plunger 31 engaged with the removable front end wall 38 of the cylinder 32.

Mounted in the handle 7 is a magazine to receive plastic material to be melted and extruded, and means is provided to feed such material from the magazine into the chamber 10 ahead of piston 29 when the latter is in retracted position behind the nipple 12 through which the material is fed from the magazine. As shown more clearly in Figures 1 and 2, the magazine may consist of a cylindrical tube 39 threaded at its upper end into nipple 12 and extending through an opening 40 in the lower end of handle 7, said tube having a lateral opening 41 below the handle through which the plastic material 42, in ribbon or like form, may be introduced into the tubular magazine. Journaled in the tubular magazine 39 is feeding element 43 consisting of a shaft having a spiral peripheral groove 44 from end to end thereof adapted to receive the plastic ribbon 42. The shaft 43 has a knob 45 on its lower end to facilitate turning thereof so as to draw the plastic ribbon into the magazine from a suitable source and to feed it into the chamber 10 as needed.

In use, piston 29 is retracted, and the plastic material is fed from the magazine into chamber 10 until the latter is filled, the element 13 having been energized to melt the plastic material as it enters the chamber 10. Trigger 21 is then operated to open valve 16, and piston 29 is caused to move forwardly to force the molten plastic material from chamber 10 through passage 11 and the bore 25 of nozzle 24. The material is applied as it emerges from nozzle 24 according to the operation being performed. When forming elements simulating members of insects in the manufacture of fishing flies, the plastic material used is polyethylene or like material which cools and begins to solidify as it emerges from the nozzle or tip of the gun.

As shown in Figures 7 and 8, another type of means may be provided for actuating piston 29. In this embodiment, the body extension 26' has a transverse plate 46 slidable therein and prevented from turning by diametric pins 47 carried by said plate and slidably projecting into longitudinal slots 48 of said extension. The rod 30' of piston 29 is swivelled at 49 to the latter, as well as being adjustably threaded at 50 through plate 46 and slidable through the rear end of extension 26' as at 51. The projecting rear end of rod 30' has a knob 52, and a helical compression spring 53 is disposed about rod 30' between plate 46 and the rear end of extension 26'. In use, rod 30' is threaded rearwardly through plate 46 to retract piston 29. By turning rod 30' while holding piston 29 retracted, plate 46 may be moved rearwardly to compress spring 53 so that when rod 30' is released, said spring will move piston 29 forwardly to force the molten material from chamber 10.

If desired, the gun may be provided, as shown in Figures 4 to 6 inclusive, with a magazine adapted to receive plastic material in stick form. This magazine consists of a tube 39' having a plug 54 swivelled on its lower end which is screwed into the lower end of handle 7'. Disposed in the tube 39' is a spring-pressed follower 55 whose actuating spring 56 forces the same upwardly to move the plastic stick 57 into chamber 10. Means 58 is provided to latch the follower in lowered position until it is desired to feed the stick upwardly. A finger piece 59 is carried by handle 7' to release the latch means 58. When the piston 29 is in retracted position, latch means 58 is released so that follower 55 will feed the stick 57 upwardly, the stick being melted, as it enters chamber 10, by the element 13. The magazine 39' is removable from handle 7' for retraction of follower 55 and reception of a new stick of plastic material.

From the foregoing description, the nature and advantages of the present invention will be apparent. Further modifications and structural changes are contemplated within the spirit of the invention as claimed.

Having described the invention, what is claimed as new is:

1. A plastic extrusion gun comprising a body portion provided with a depending hollow handle and formed with a cylindrical heating chamber and a front restricted outlet passage, heating means for melting plastic material in said heating chamber, a magazine for plastic material mounted in the handle and communicating at its upper end with said heating chamber, mechanical feeding means in the magazine to feed plastic material upwardly from the magazine into said heating chamber, a piston in the heating chamber, power means to project the piston for forcing molten plastic material from said heating chamber through said outlet passage, manually operable means to retract said piston, a spring-closed valve for controlling flow of molten material through said outlet passage, and a trigger carried by the handle and operatively connected to said valve.

2. A plastic extrusion gun comprising a body portion provided with a depending hollow handle and formed with a cylindrical heating chamber and a front restricted outlet passage, heating means for melting plastic material in said heating chamber, a magazine for plastic material mounted in the handle and communicating at its upper end with said heating chamber, feeding means to feed plastic material from the magazine into said heating chamber, piston means for forcing molten plastic material from said heating chamber through said outlet passage, a spring-closed valve for controlling flow of molten material through said outlet passage, and a trigger carried by the handle and operatively connected to said valve, said magazine having an inlet opening near its lower end through which the plastic material in ribbon form may be introduced, said feeding means comprising a rotatable shaft journaled in the magazine and having a spiral peripheral groove to receive the plastic ribbon.

3. A plastic extrusion gun comprising a body portion provided with a depending hollow handle and formed with a cylindrical heating chamber and a front restricted outlet passage, heating means for melting plastic material in said heating chamber, a magazine for plastic material mounted in the handle and communicating at its upper end with said heating chamber, mechanical feeding means in the magazine to feed plastic material upwardly from the magazine into said heating chamber, piston means for forcing molten plastic material from said heating chamber through said outlet passage, a spring-closed valve for controlling flow of molten material through said outlet passage, a trigger carried by the handle and operatively connected to said valve, and a hollow extension removably secured on the rear of the body portion and having a transverse wall closing the rear end of the heating chamber, said piston means comprising a piston reciprocable in the heating chamber and retractible rearwardly of the outlet of the magazine, and operating means for the piston carried by said extension, said operating means including power means to project and manually operable means to retract the piston.

4. A plastic extrusion gun comprising a body portion provided with a depending hollow handle and formed with a cylindrical heating chamber and a front restricted outlet passage, heating means for melting plastic material in said heating chamber, a magazine for plastic material mounted in the handle and communicating at its upper end with said heating chamber, feeding means to feed plastic material from the magazine into said heating chamber, piston means for forcing molten plastic material from said heating chamber through said outlet passage, a spring-closed valve for controlling flow of molten material through said outlet passage, and a trigger carried by the handle and operatively connected to said valve, and a hollow extension removably secured on the rear of the body portion and having a transverse wall closing the rear end of the heating chamber, said piston means comprising a piston reciprocable in the heating chamber and retractible rearwardly of the outlet of the magazine, a cylinder threaded through the rear end of said extension for manual adjustment longitudinally of the same, a plunger reciprocable in said cylinder, a rod connecting the piston and the plunger, and means to force the plunger forwardly to similarly move the piston, said cylinder being manually movable rearwardly to retract the piston.

5. A plastic extrusion gun comprising a body portion provided with a depending hollow handle and formed with a cylindrical heating chamber and a front restricted outlet passage, heating means for melting plastic material in said heating chamber, a magazine for plastic material mounted in the handle and communicating at its upper end with said heating chamber, feeding means to feed plastic material from the magazine into said heating chamber, piston means for forcing molten plastic material from said heating chamber through said outlet passage, a spring-closed valve for controlling flow of molten material through said outlet passage, and a trigger carried by the handle and operatively connected to said valve, said magazine being adapted to receive a stick of plastic material, said feeding means comprising a spring-pressed follower movable in the magazine, latching means to latch the follower in retracted position, and means carried by the handle for releasing said latching means.

WILLIAM R. MYERS.
ALBERT S. TENNANT.

REFERENCES CITED

The following references are of record in the file of this patent:

UNITED STATES PATENTS

| Number | Name | Date |
|---|---|---|
| 1,430,533 | Brown | Oct. 3, 1922 |
| 1,883,282 | Zerk | Oct. 18, 1932 |
| 2,107,686 | Bramsen et al. | Feb. 8, 1938 |
| 2,437,264 | Manning | Mar. 9, 1948 |